UNITED STATES PATENT OFFICE.

CARL FRANKLIN YOUNG, OF KANSAS CITY, KANSAS.

PATCH MATERIAL FOR RUBBER ARTICLES.

1,333,196. Specification of Letters Patent. Patented Mar. 9, 1920.

No Drawing. Application filed August 17, 1917. Serial No. 186,779.

*To all whom it may concern:*

Be it known that I, CARL FRANKLIN YOUNG, a citizen of the United States, residing at Kansas City, in the county of Wyandotte and State of Kansas, have invented certain new and useful Improvements in Patch Material for Rubber Articles, of which the following is a specification.

The invention relates to improvements in a patch material adapted for application to a rubber article of any nature to seal an aperture or cut therein to render the article airtight.

The invention also relates to the composition, forming the patch material, which is in the nature of a rubber mass, and susceptible of being worked, when in a cold condition by the hand into a patch of any configuration to be applied to a rubber article, sealing the aperture therein solely by pressure exerted upon the patch. This eliminates the use of cement or other adhesive substances which have heretofore been applied to the surface of a punctured article prior to the application of the patch, as well as the utilization of heat or repairing tools, it being understood that the rubber mass from which the patch is formed contains its own adhesive ingredients.

The patch material is composed of caoutchouc or other rubber substance, which is passed through a treating process and formed into what is known as tread or tube gum, which is nothing more than a pure gum sheet capable of great elasticity, although somewhat spongy. The caoutchouc has added thereto and thoroughly intermixed therewith a number of ingredients, namely: a solvent, which is preferably carbon disulfid, and adhering substances, which are preferably wood alcohol, and gasolene or benzin which maintain the mass in a proper consistency. When a quantity of the material is to be made, the following formula has been found to provide a mass of the proper consistency and qualities to thoroughly seal an opening within any rubber article: With every five pounds of caoutchouc or other suitable rubber substance there is added five pounds of carbon disulfid, five quarts of gasolene or benzin, and one pint of alcohol, all the ingredients being disposed within a mixing vessel to be thoroughly dissolved. To incorporate and intermix the various ingredients, the mixing vessel is then placed within a larger container which contains a large quantity of hot or boiling water, completely dissolving all the various ingredients in the mixing chamber. The dissolving of these ingredients under the influence of heat causes a thorough intermixing and incorporating thereof, the wood alcohol with the rubber producing an adhesive agent serving the purpose of maintaining the patch upon a rubber article by a method which will be later described. After the ingredients have been thoroughly dissolved a quantity of water is poured within the mixing chamber and the contents thereof boiled until the mass is of the proper consistency. If, for any reason, the material should become too stiff or hard to work, a small amount of gasolene will soon render the same of a proper consistency, although ordinarily the application of an additional quantity of gasolene is not required.

The composition thus prepared, containing the unmixed caoutchouc, carbondisulfid, wood alcohol and gasolene, is taken from the mixing chamber in mass formation, being relatively soft and pliable and capable of being worked with the hands into a patch of any shape, and retaining this shape for an indefinite period. The rubber mass is capable of being worked in the manner to which we alluded when in a cold state, and it is apparent that punctures and blow-outs of various configurations frequently occur, and to efficiently repair the same the patch material can be freely worked into a patch of any shape and applied to the rubber article without utilizing heat, a layer of cement or repairing tools which have been heretofore universally employed when patching rubber articles. The rubber mass possesses the same elasticity as the rubber article to be patched, yet it is of a consistency which will freely hold its shape until worked by the hands of the user into a patch and can be packed and transported without any danger of breaking down.

When an article, whether it be a tire, foot ball, hot water bag, or the like is punctured or broken and it is desired to mend the same, the patch material, which may be put up in cartridge or pellet form, is dipped into gasolene and the surface of the rubber article adjacent the aperture therein is thoroughly rubbed until its surface has a good rubber coating, caused by the adhering of particles, of the rubber patch, which also leaves on the article an adhesive surface. After this rubbing action the gasolene that remains on the surface of the article to be repaired is allowed to evaporate, and the article is then in condition to receive the patch. This patch is formed by working the rubber patch material when in a cold state into any desired shape, depending upon the shape of aperture to be sealed in the rubber article, and is then applied to the previously treated surface. In forming the patch a piece of the rubber material may be torn from the mass and worked into the desired patch, or the material may be put in pellet form, each pellet containing a sufficient quantity of material to repair a single puncture. When the patch is applied to the previously treated surface of the article containing the aperture no cement is necessary, and it is only required that the patch be firmly pressed by the fingers upon the article, and the same will readily adhere thereto. The patch material contains its own adhesive, due to the action of the wood alcohol upon the rubber, and when the material has been dipped into the gasolene and rubbed into the surface of the punctured article it makes its own coating which will seal the applied patch to the article.

This method of mending a rubber article, which consists in first rubbing the article with the patch material after the same has been dipped in gasolene to leave a rubber and adhesive surface thereon, thence allowing the gasolene to evaporate and applying a patch to said treated surface, does away with the employment of heating or vulcanizing tools, cement or the like, which has heretofore been applied prior to the application of the patch, it being understood that the present patch has inherent adhesive substances to seal the same upon a rubber article.

In describing the invention the proportions of the various ingredients have been set forth, but it will of course be understood that various quantities of the ingredients may be employed, and the equivalents of these ingredients may be used without departing from the spirit of the invention.

Having thus described the invention, what I claim is:

1. A patch material for rubber articles, or articles containing rubber, said material being of substantially mass formation, and susceptible of being formed when in a cold condition into a patch of a desired shape, said material having inherent adhesive properties whereby the material is adapted to be applied to the rubber article or the article containing rubber for sealing an aperture therein, and to be retained in position.

2. A patch material disposed in mass formation, and of a consistency susceptible of being formed when in a cold condition by the hand into a patch of any desired formation for application to a rubber article to seal an aperture therein, said material having inherent adhesive substance for retaining the same in place.

3. A patch material disposed in mass formation, and susceptible of being formed when in a cold condition into a patch of any formation and remaining in said patch shape, after the formation thereof, said material having inherent adhesive substances.

4. A patch material of solid formation having certain adhesive properties and being susceptible of being formed into a patch of any shape and adapted to be applied without other adhesive means to a rubber article for sealing an aperture therein.

5. A patch material of solid formation susceptible of being formed into a patch of any shape and adapted to be applied to a rubber article for sealing an aperture therein, said material having inherent adhesive substances for retaining the same in position.

6. A patch material adapted to be carried in solid bulk formation, said material being of such a nature as to permit portions thereof to be taken from the bulk and formed into a patch of any shape, the material having inherent adhesive substance incorporated therein for retaining the same in position.

7. A patch material of bulk formation being of a nature susceptible of being worked by the hand of the user into a patch of any desired shape, said material having incorporated therein adhesive substances for firmly retaining the same in position.

In testimony whereof I hereunto affix my signature in the presence of two witnesses.

CARL FRANKLIN YOUNG.

Witnesses:
E. L. CALENE,
C. A. LOWDER.